April 5, 1955  A. L. REISER  2,705,592
FLUID DISPLACING MECHANISM
Filed Feb. 28, 1951  2 Sheets-Sheet 1
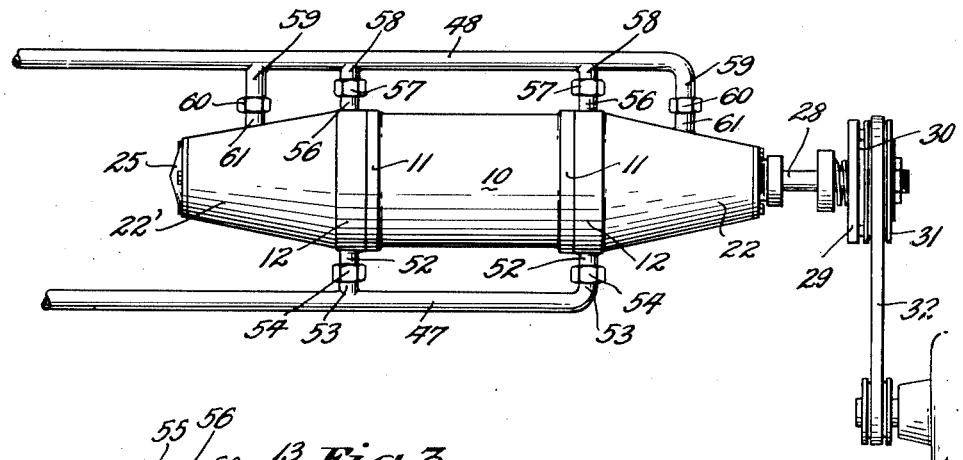
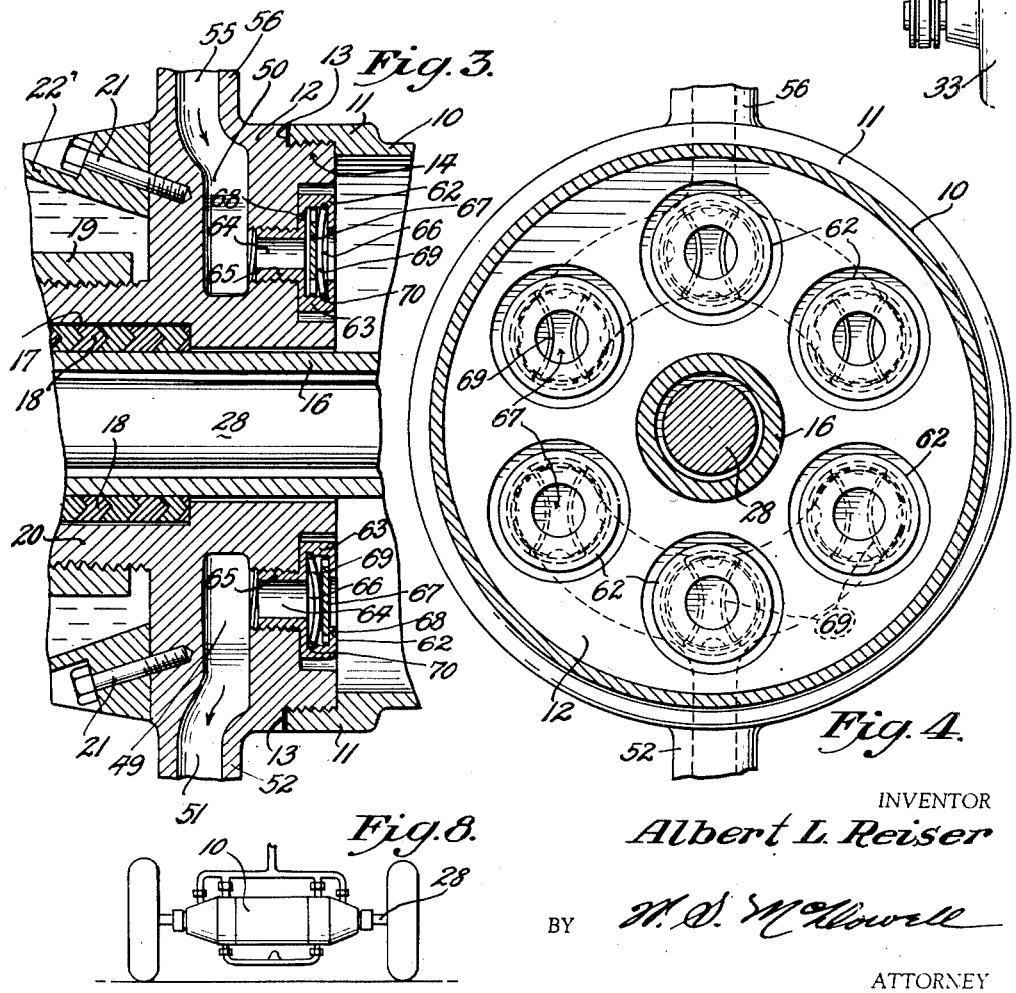
INVENTOR
Albert L. Reiser
BY *[signature]*
ATTORNEY

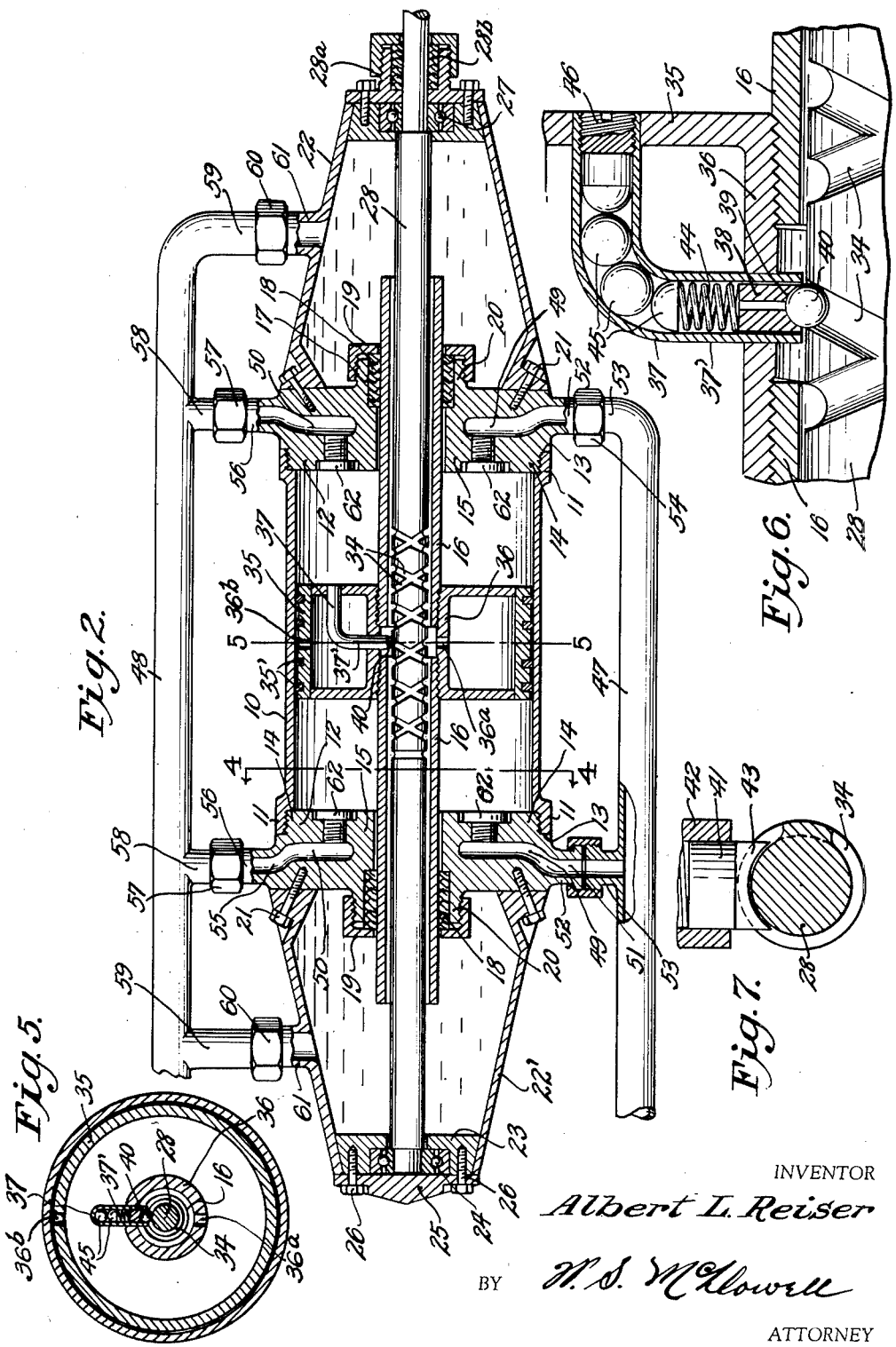

United States Patent Office 2,705,592
Patented Apr. 5, 1955

2,705,592

FLUID DISPLACING MECHANISM

Albert L. Reiser, Columbus, Ohio

Application February 28, 1951, Serial No. 213,126

5 Claims. (Cl. 230—188)

This invention relates to power-actuated fluid-displacing mechanism, having particular reference to an improved compressor, servomotor or pump unit for employment in heating, control, refrigerating, air-conditioning and power-imparting systems, particularly systems wherein fluids are subjected to compression, displacement or temperature modification.

An object of the invention is to provide fluid-displacing mechanism wherein is embodied a cylinder-confined reciprocating piston driven by or imparting motion to a rotary shaft extending axially through the piston.

Another object is to provide fluid-displacing mechanism wherein an associated operating shaft is provided with continuous relatively intersecting right and left-hand grooves adapted for the reception of a follower member carried by an associated piston, whereby to impart fluid-displacing reciprocatory movement to the piston upon rotation of the shaft, or rotation to the shaft upon sliding actuation of the piston.

A further object is to provide a piston in a fluid-displacing mechanism of the character set forth with axially disposed and longitudinally extending guides, the latter projecting from the opposite sides of the piston for sliding movement in unison with the piston about an associated rotary cross-grooved power shaft, the ends of the guides being supported in an inner set of packing-containing bearings for sliding movement; to form the guides for communication with lubricant-containing chambers arranged on opposite sides of the housing of the mechanism, the said guides operating to transmit a fluid lubricant from said chambers to the piston and thence through radial passages formed in the piston to the walls of a gas tight cylindrical chamber of the housing in which the piston is slidably mounted, whereby to efficiently lubricate relatively movable parts of the mechanism.

For a more detailed understanding of the present invention, including additional objects and advantages thereof, reference is to be had to the following description and the accompanying drawings, wherein:

Fig. 1 is a side elevational view of the fluid-displacing mechanism comprising the present invention;

Fig. 2 is a vertical longitudinal sectional view taken through said mechanism;

Fig. 3 is an enlarged vertical longitudinal sectional view developing in greater detail the construction of the valve mechanism of my improved fluid-displacing mechanism;

Fig. 4 is a transverse cross-sectional view taken on the plane indicated by the line 4—4 of Fig. 2;

Fig. 5 is a similar view on the line 5—5 of Fig. 2;

Fig. 6 is an enlarged vertical sectional view taken through the ball-type follower used in transmitting motion from the rotary shaft of my improved mechanism to its reciprocating piston;

Fig. 7 is a detail sectional view disclosing a slightly modified form of follower;

Fig. 8 is a detail elevational view of a further modified form in which the unit is employed in connection with road and rail vehicles.

As shown in the accompanying drawings, my improved fluid-displacing mechanism comprises a power-driven unit which in the form of the invention illustrated, consists of a gas compressor, such as the so-called "sealed" units utilized in refrigerators and in other domestically used appliances. In the forms of the invention illustrated, this unit comprises a cylinder 10, having bell flanges 11 at the ends thereof. Further completing the housing of which the cylinder 10 forms a part, are cylinder heads 12, the latter being located at each end of the cylinder 10. Each of these heads is formed with an annular shoulder 13 and an externally threaded portion 14 which is received in an internally threaded socket formed by an adjoining flange 11. Centrally, each of the heads 12 includes a bored hub region 15 in which is slidably positioned a pair of piston-carried, longitudinally aligned tubular guides 16. Each of the heads 12 is formed with a chamber 17 which receives a packing 18, and each of the latter is held in lubricant-sealing engagement with the exterior of its associated guide tube 16 by a nut 19 carried by an externally threaded extension 20 forming an integral part and projecting axially from the hub region of each of the heads 12. In this construction, the packings 18 form a set of inner seals in maintaining an associated piston cylinder gas tight.

Detachably bolted as at 21 to the heads 12 are hollow lubricant-receiving end members 22 and 22', which also form parts of the stationary housing of my improved fluid-displacing unit.

The end member 22', shown at the left of Fig. 1, is formed with a bearing disk 23. Peripherally this disk is provided with frusto-conical surfaces conforming with the conical taper of the inner wall surfaces of the member 21'. Positioned in the disk 23 is an antifriction bearing 24. In connection with this structure, use is made of a closure plate 25, which engages circumferentially with the outer end of the member 22' and is held in contact therewith by means of the screw bolts 26, the threaded shanks of the latter being received in threaded openings formed in the disk 23. By tightening the bolts 26 the disk is drawn forwardly and maintained in positive sealing contact with the conically reduced outer portion of the end member 22', sealing the latter against escape of the body of lubricant normally maintained within the member 22'. Also, the tightening of the bolts 26 maintains the closure plate 25 in its operative position against the open end of the member 22'.

The end member 22 shown at the right of Fig. 1, is of the same general shape as the end member 22' and at its outer end includes an antifriction bearing 27 corresponding in construction and function to the bearing 24, both bearings being utilized in effecting the rotary support of a longitudinally extending power-delivering shaft 28, which is located axially of the unit housing. The open ends of the guide tubes 16 project into the lubricant-containing chambers of the end members 22 and 22' beyond the inner seals 18, so that the lubricant will pass between the inner walls of the tubes 16 and around the power shaft 28. The latter shaft projects beyond the bearing 27 provided in connection with the end member 22, and passes through an outer bearing 28a containing a packing 28b. If desired, the shaft 28 may project through both ends of the housing, as shown in Fig. 8. Exteriorly of the unit housing the shaft 28 may be formed with a clutch member 29, which is engaged with a complemental clutch member 30 forming a part of a pulley 31, the latter being driven by an endless belt 32, or its equivalent, from a prime mover 33, which may be in the form of an electric motor or other power-delivering, power-actuated or power-receiving member. Normally, the clutch member 30 is engaged, the same being of the friction type so that if for any reason the compressor unit is overloaded, the clutch will slip and protect the same. Other equivalent means, of course, may be employed for imparting power to the shaft 28.

Intermediately of its length, the shaft 28 is provided with continuously communicating relatively intersecting right and left-hand grooves 34. Mounted for reciprocation in the cylinder 10 is a piston 35 provided with rings 35'. In this instance, the piston is formed with an interiorly threaded axial hub 36, which receives the externally threaded, relatively spaced and adjacent ends of the guide tubes 16, said tubes and piston forming a composite structure. The piston operates in a cylinder chamber which is sealed off or spaced from the lubricant chambers by the inner seals formed by the packings 18. As shown in Figs. 2 and 5, the hub 36 of the piston is formed with a port 36a which is disposed centrally of the piston at a position between the spaced inner ends of the guide tubes 16. Lubricant from the reservoir chambers contained in the end members 22 and 22' of the housing travels from said chambers through open ends of the guide tubes projecting into the chambers of the end members beyond the heads 15, entering the passages formed between the inner walls of the guide tubes and outer surfaces of the shaft 28. Means are thus provided to lubricate mechanism, hereinafter defined, translating rotary motion of said shaft into reciprocatory motion on the part of the piston 35. Also, a portion of this supply of lubricant passes through the port 36a into the hollow interior of the piston 35, and thence by way of a port 36b, formed in the outer peripheral wall of the piston, for deposit upon the inner surfaces of the cylinder 10.

To cause reciprocation of the piston from the rotary power shaft 28, the piston is formed with a tubular internal elbow 37. The vertical branch 37' of this elbow includes an internal slidably-mounted follower 38, the latter being formed at its lower end with a semispherical socket 39 in which is positioned a ball element 40 constituting a part of the follower structure. The diameter of the ball element is such that while the upper part thereof is disposed in the socket 39, the lower part of said element will be positioned in the continuous intersecting grooves 34 provided intermediately of the shaft 28. The ball element follows the contour of the grooves 34 as the shaft is rotated, and by reason of its being carried by the elbow 37, the ball element will serve to effect reciprocation of the piston with the rotation of the power shaft 28.

Of course, other types of followers may be used. For example, in Fig. 7 of the drawings, the follower shown at 41 is swiveled for turning movement in the lower end of a piston-carried tube 42. The follower 41 is formed with a knife edge 43 constituting a bit being received in the cross grooves 34 of the shaft 28 so that the piston will be reciprocated as the power shaft turns. Various other types of followers may be used with equal efficacy.

In the preferred construction illustrated in Fig. 6, the elbow 37 is provided internally with a compression spring 44. One end of this spring presses on the follower 38, whereby to positively maintain the ball element 40 in seated engagement with the cross grooves 34. The upper portion of the spring 44 engages with a plurality of flexibly joined ball elements 45, which may be inserted into the tubular elbow when the threaded closure plug 46, provided at the upper end of the elbow is removed, thus facilitating the insertion or removal of the follower 38 and its associated ball element 40 in the assembly and maintenance of the mechanism.

Communicating with the valve heads 12 and disposed exteriorly of the housing of the mechanism is a compression manifold 47 and a suction manifold 48. Gases compressed by the mechanism of the present invention are delivered to the manifold 47, and gases delivered or returned to my improved compressor are supplied through the manifold 48.

When my improved crankless gas compressor is employed as an element of a refrigerating system, the manifold 47 may lead to an expander or the like, not shown, and the suction or return manifold 48 may lead from the return side of such an expander to the compressor unit. In this instance, the cylinder heads 12 have been shown as provided with chambers 49 and 50, the chamber 49, which communicates with the compressed gas manifold 47 is joined with a passage 51, which projects through an exteriorly threaded extension 52, the latter being associated with extensions 53 provided on the compression manifold 47, the extensions 52 and 53 being united by means of coupling nuts shown at 54.

Likewise, the chamber 50 of each of the heads 12 communicates with the intake or suction manifold 48. In this instance, each of the chambers 50 is formed with a communicating passage 55 which leads to a valve head extension 56. Each of the extensions 56 is externally threaded and coupled by means of a nut 57 with corresponding extensions 58 formed on the suction or intake manifold 49. Also, the intake manifold 48 is provided with pipe extensions 59 which are coupled by means of nuts or their equivalents 60 with extensions 61 provided on the lubricant holders or end members 22. The extensions 59 and 61 provide for the return of lubricating oil forced through the gas-conducting system associated with my improved compressor, enabling the lubricant to be circulated with the refrigerant or other gases acted upon by the compressor.

The exhaust and intake chambers 49 and 50 respectively of the valve heads 12 are joined by means of the valves 62 with the piston chamber of the cylinder 10. The valves of the exhaust chamber are disposed in reverse order to those of the intake chamber, otherwise the constructions are the same. While these valves may be of several different forms, a simple way of constructing and mounting the same is to provide each of the heads 12 with a plurality of said valves which are so formed and arranged as to control the flow of fluid in a desired direction therethrough.

Each of these valves comprises a body 63 formed with an axial bore 64, a threaded stem 65 and a disk chamber 66. Positioned in each of the chambers 66 is a disk-type valve member 67 which is normally pressed against a seat 68 by means of a looped wire spring 69 or its equivalent, the outer portion of each spring being received in a retention groove 70 formed circumferentially of the chamber 66.

With this arrangement, when the set of valves providing for the inflow of gas into the piston chamber are open, the opposite set of valves on the same side of the piston providing for the exhaust of compressed gas from the piston chamber remain closed, and vice versa.

In view of the foregoing, it will be seen that the present invention provides a crankless gas compressor in which the power shaft employed in imparting reciprocating motion to an associated gas-displacing piston passes centrally through the piston. Also, with the employment of the movable piston-carried tubes, and in association with the lubricant-receiving chambers provided in the end members 22 and 22', provision is made for effecting complete and efficient lubrication of the compressor unit and in a manner offering sealed protection of a long-lasting nature.

Among the advantages of the invention are the following: a fluid-displacing unit which is exceptionally light in weight; a unit which has greater capacity for its overall size than other types of equipment employed in similar capacities; a unit that may be caused to operate at relatively slow speed with respect to piston cycles per minute; a fluid-displacing unit which is compound or double acting, there being a definite volumetric displacement twice and in equal amounts in every complete piston cycle; another advantage of this construction is that no flywheel or counterbalance of any kind are required for its operation although such a wheel may be used in cases where the present invention is adapted to motor or engine construction; the mechanism operates without vibration, there being no centrifugal force to be reckoned with since the thrusts of the drive shaft and the piston are in the same general directions; the device lends itself for use in what may be termed a "sealed" capacity. This is explained by the fact that the device and all its frictional parts are submerged in lubricating oil, such oil supply being permanent and in such quantity as to insure an indefinite period of operation without replenishment; the device may be readily assembled or disassembled in the field for inspection or parts replacement; the device while light in weight is unusually rugged and will withstand stress far in excess of its normal requirements; in size my improved unit is miniature in comparison to other units of similar capacity and purpose; my improved machine weighs but a fraction of what other machines of similar capacity weigh. One of my units having a six-inch bore and a six inch stroke weighs approximately 30 pounds, and operating at one cycle per second it has a pumping capacity in excess of 11½ cu. ft. min., or in refrigeration terms, 18,000 B. t. u. per hour, which is equal to a modern 2 H. P. compressor weighing 150 pounds; and the features of the present invention are applicable to gas compressor units employed for many different purposes, liquid-handling pumps, servomotors, and vacuum-creating apparatus.

In Fig. 7, my improved fluid-displacing unit has its power shaft 28 extended beyond both ends of the housing, so that the projecting outer ends of the shaft may be equipped with road or trackway-engaging wheels. The unit of Fig. 7 is particularly adapted to furnish mechanical refrigeration for highway or railroad vehicles. Also, my unit may be readily compounded to provide multi-stage compression as well as single stage. The features of my invention may also be used in engine or motor construction as well as in pump or compressor design.

In view of the foregoing, it will be appreciated that the mechanical construction of my improved fluid-displacing unit is subject to considerable structural variation from the forms of the invention herein selected for illustration, therefore my invention is not to be considered as restricted to the apparatus illustrated, but shall include within its perview all such modifications falling fairly within the scope of the following claims.

I claim:

1. Fluid displacement mechanism comprising: an outer housing formed to include a cylindrical body section defining an internal piston-receiving chamber; end members forming a part of said housing and disposed at the opposite ends thereof, said members being formed with lubricant-receiving chambers of storage capacity; spaced heads formed with fluid inlet and outlet passages, said heads being carried by said housing as component parts thereof and disposed in positions separating said body section from said end members; fastening means uniting said heads, body section, and end members in rigidly connected axially aligned longitudinal order; a rotary shaft extending axially and longitudinally of said housing and projecting outwardly at one end thereof beyond the housing; a piston slidable in said piston chamber; motion-transmitting means producing conjointly reciprocating movement of said piston with rotation of said shaft; valve means provided in the passages of said heads controlling the admission and exhaust of a working fluid into and from said piston chamber in response to displacement forces produced by reciprocation of said piston; open-ended tubular guide means joined with and projecting longitudinally and axially from said piston for movement in unison therewith, said guide means extending into said lubricant chambers through openings provided axially in said heads, said shaft being rotatably positioned in said guide means and disposed in parallel relation thereto; inner sets of packing devices carried by said heads cooperative with the openings therein to seal the lubricant chambers from the piston chamber; bearings formed in the outer ends of said end members in spaced relation from said heads for the rotatable reception of said shaft; and outer packing-type sealing means carried by one of the end members of said housing and cooperative with the outwardly projecting end of said shaft to retain lubricant in the lubricant chamber associated therewith, said guide means being spaced from said shaft to form a passage for conducting the lubricant from said lubricant chambers to said piston to lubricate said motion-translating means, and said piston being formed with a passage communicating with said guide means passage for conducting said lubricant in part to the inner wall of said piston chamber.

2. In fluid displacement mechanism; a housing including an internal piston chamber; heads secured to and forming component parts of said housing, said heads being arranged at opposite ends of said housing and containing inlet and discharge passages for the transmission of a working fluid to and from said piston chamber; a piston slidable in said chamber; a rotary shaft disposed axially and longitudinally of said chamber and the piston therein; motion-translating means providing conjoint reciprocatory movement of said piston with rotation of said shaft; valve means disposed in the fluid-conducting passages of said heads and controlling the admission and exhaust of the working fluid into and from said cylinder in response to displacement forces produced by the reciprocation of said piston; end members secured to and forming component parts of said housing, said members being disposed on the opposite sides of said heads and in longitudinal axial alignment with said chamber and including internal lubricant-receiving chambers; bearing means carried by said end members in which said shaft is journaled for rotary movement only; tubular extensions carried by and projecting axially from each side of said piston and disposed around said shaft, the outer ends of said extensions projecting through openings formed axially in said heads and terminating in the lubricant chambers of said end members, said extensions internally thereof being spaced from said shaft to form a lubricant passage for transmitting a fluid lubricant from the chambers of said end members to the motion-translating means; and port means formed in said piston for conducting said lubricant to the walls of the piston chamber.

3. In fluid displacement mechanism; a housing including an internal piston-receiving chamber; hollow lubricant-receiving end members secured to the ends of and forming stationary and component parts of said housing, the hollow interiors of said end members forming lubricant-receiving chambers of storage capacity; a piston slidable in said piston-receiving chamber; a rotary shaft disposed axially and longitudinally of said housing and piston therein; motion-translating means providing conjointly reciprocatory movement of said piston with rotary movement on the part of said shaft; heads forming component parts of said housing, said heads extending transversely of the housing and separating said piston-receiving chamber from the lubricant-receiving chambers of said end members, said heads containing inlet and discharge passages for the transmission of a working fluid to and from said piston chamber; valve means positioned in said heads and operative upon sliding movement of said piston to draw gaseous fluids into and discharge the same from said piston-receiving chamber on opposite sides of said piston by way of said head passages; reciprocatory open-ended tubular extensions surrounding said shaft and on which said piston is mounted, said extensions projecting through aligned openings formed in said heads and having their outer ends terminated in the lubricant chambers of said end members, said shaft and extensions being relatively spaced to provide lubricant-conducting passages leading from said lubricant chambers to said motion-translating means; bearings provided in said end members for the rotatable support of said shaft; and fluid-confining packings carried by the aligned openings of said heads, said packings having fluid-sealing engagement with the outer walls of said reciprocatory extensions.

4. In gas-compressing apparatus; an elongated housing embodying a cylinder section having an internal gas-receiving and compressing chamber; end members formed with chambers of storage capacity for the reception of a liquid lubricant, said members being arranged at the ends of said cylinder section; transversely extending partitioning heads forming a part of said housing and disposed between said cylinder section and said end members; means uniting said cylinder section, partitioning heads, and end members in rigidly joined longitudinally aligned housing-forming order; a piston slidable in said gas-compressing chamber; a rotary shaft disposed axially and longitudinally of said housing, said shaft projecting externally of the housing at one end thereof; motion-translating means providing conjoint reciprocatory movement of said piston with the rotation of said shaft, said heads being formed with inlet and discharge passages for the transmission of an elastic working fluid to and from said compressing chamber; valve means mounted in said heads and operative upon reciprocation of said piston to provide for the introduction of said working fluid into and the discharge of the same from said compressing chamber; bearing means formed in said end members for the rotatable support of said shaft; axially disposed open-ended tubular extensions joined axially with said piston, said extensions passing through axially aligned openings formed in said heads and being disposed in parallel order with said shaft and spaced from the latter to form therebetween lubricant-conducting passages leading from said lubricant chambers to said piston and motion-translating means; fluid-sealing packing means carried by said heads and surrounding said extensions where the same project through the openings in said heads; and compressible packing means carried by the outer end of one of said end members, said last-named packing means having engagement with the end region of said shaft projecting externally of said housing.

5. In gas-compressing apparatus as defined in claim 4, and wherein the apparatus is further characterized by providing the lubricant-containing chambers in the end members joined with the housing with pipe extensions providing for the return of lubricating oil present in the compressed gaseous fluids discharged from said cylinder to said lubricant-holding chambers.

References Cited in the file of this patent

UNITED STATES PATENTS

| | | |
|---|---|---|
| 129,631 | Waring | July 16, 1872 |
| 1,233,858 | Farmer | July 17, 1917 |
| 2,425,813 | Kuntz | Aug. 19, 1947 |

FOREIGN PATENTS

| | | |
|---|---|---|
| 185,868 | Great Britain | Sept. 20, 1922 |